Figure 1:
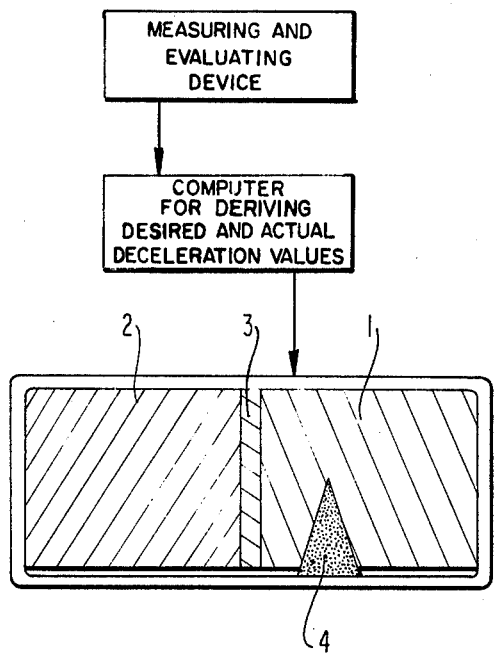

United States Patent [19]
Paul et al.

[11] 4,095,551
[45] Jun. 20, 1978

[54] INDICATING ARRANGEMENT FOR A DISTANCE WARNING INSTALLATION IN MOTOR VEHICLES

[75] Inventors: Jürgen Paul; Walter Kostelezky, both of Stuttgart, Germany

[73] Assignee: Daimler-Benz Aktiengesellschaft, Germany

[21] Appl. No.: 774,543

[22] Filed: Mar. 4, 1977

[30] Foreign Application Priority Data

Mar. 5, 1976 Germany ............................ 2609046

[51] Int. Cl.² ............................................. G01P 15/00
[52] U.S. Cl. ..................... 116/35 R; 73/509; 73/514
[58] Field of Search ................ 116/35 R, 116; 340/52 R, 52 F, 62, 104, 110, 258 R, 258 A; 73/514, 509, 517 R; 180/82 R, 98; 343/7 ED, 7 VM, 9

[56] References Cited

U.S. PATENT DOCUMENTS

| 2,831,182 | 4/1958 | Kamins ........................... 340/52 R |
| 2,996,137 | 8/1961 | Chu et al. ........................ 343/7 VM |
| 3,088,432 | 5/1963 | Nallinger .......................... 116/116 |

FOREIGN PATENT DOCUMENTS

1,122,741  1/1962  Germany ........................... 340/52 R

Primary Examiner—James J. Gill
Attorney, Agent, or Firm—Craig & Antonelli

[57] ABSTRACT

An indicating arrangement for a distance warning system in motor vehicles which are equipped with measuring and evaluating devices for determining the distance of the vehicle to an obstacle disposed in front thereof and for determining the approach velocity to this vehicle; a desired value is thereby derived from the determined values for the brake deceleration necessary for the avoidance of a collision and an actual value is determined from the actual deceleration values attained during the braking operation whereby only the difference or the ratio of desired and actual value is thereby indicated to the driver.

9 Claims, 2 Drawing Figures

INDICATING ARRANGEMENT FOR A DISTANCE WARNING INSTALLATION IN MOTOR VEHICLES

The present invention relates to an indicating arrangement for a distance warning installation in motor vehicles, which is equipped with measuring and evaluating devices for determining the distance of the vehicle to an obstacle disposed in front thereof and for determining the approach velocity to this obstacle, whereby a desired value is determined from the determined values for the brake deceleration necessary for the avoidance of a collision and an actual value is determined from the actual deceleration values attained during the braking operation which are compared with each other for an indication, as described in the prior German patent application No. P 25 12 144.2 filed in Germany on Mar. 20, 1975, the subject matter of which is incorporated herein. The U.S. application Ser. No. 668,422 filed in the name of Manfred H. Burckhardt on Mar. 19, 1976, and assigned to the assignee of the instant application, corresponds to the German patent application No. P 25 12 144.2.

Inter alia, an indicating arrangement for a distance warning installation is described and claimed in the aforementioned German patent application, in which a desired value indication, for example, in the form of a travelling light point, takes place on a scale, on which are applied different attainable deceleration values, which permits to the driver to recognize whether a brake deceleration is necessary by reason of an obstacle disposed in front of him and whether this brake deceleration can be achieved with his vehicle. This is possible because different deceleration values, for example, dependent on the road condition are put on the scale. Additionally, in a special construction, an actual value indication is to be compared with this desired value according to the aforementioned German patent which is determined by differentiation of the vehicle velocity measured by the rolling-off vehicle wheels. It then becomes possible for the driver with the thus constructed indicating arrangement to apply at every instant the correct braking intensity which can be determined in that the actual value coincides as much as possible with the desired value. Every deviation between the two values means that either too little or too much braking is already applied.

The present invention is concerned with the task to simplify the indicating arrangement according to the aforementioned German patent application insofar as a possibility is to be created to save for the driver the task of comparing two indications for the actual value and the desired value travelling on or moving along a scale.

The present invention resides in that only the difference or the ratio of desired value and actual value is indicated. As a result of this construction, the driver needs to observe only a single indication which indicates to him what the difference is between the desired value and the actual value or what the ratio is between these two values. This can take place in a simple manner, for example, acoustically or optically, and more particularly advantageously in that the optical indication is undertaken with lamps lighting up in different colors, of which one lights up when no brake deceleration is required and the other lights up when a braking becomes necessary. The brightness, i.e., the light intensity of the two lamps, can also be controlled by conventional means in dependence on the difference or the ratio of desired and actual value in such a manner that, for example, the light indicating the braking necessity lights up ever more weakly or dimly when the distance to the preceding vehicle becomes larger and consequently as strong a deceleration is no longer necessary. At the same time, also the second light may then already slowly begin to glow, when to an increasing extent those values are attained which indicate that no braking deceleration is necessary any longer. The driver can then recognize, when both lamps light up approximately equally strongly, that the desired value and the actual value essentially coincide and he can then adjust his driving in a very simple manner according to the light intensity of the two lamps, for example, of red and green color without necessary observation-and mental-processes, whereby green is used when no brake deceleration is necessary and red is used when a brake deceleration is necessary.

Of course, it is also possible in lieu of such a type of indication to realize an indication in the form of a field with two different colors, on which a single indicator indicates the deviation of the actual value from the desired value.

Accordingly, it is an object of the present invention to provide an indicating arrangement for a distance warning system in motor vehicles which avoids by simple means the aforementioned shortcomings and drawbacks encountered heretofore.

Another object of the present invention resides in an indicating arrangement for a distance warning installation in motor vehicles which further simplifies the use thereof by the driver.

A further object of the present invention resides in an indicating arrangement of the type described above which saves the driver the trouble of comparing two indications for the actual value and the desired value which move along a scale.

Still a further object of the present invention resides in an indicating arrangement for a distance warning system in motor vehicles which requires the observation of only a single indication on the part of the driver.

Another object of the present invention resides in an indicating arrangement for a distance warning system in motor vehicles which is simple in construction, yet provides all the necessary information for the driver while simultaneously simplifying the observation and minimizing the mental processes on the part of the driver to evaluate the observed indications.

Figure 2:
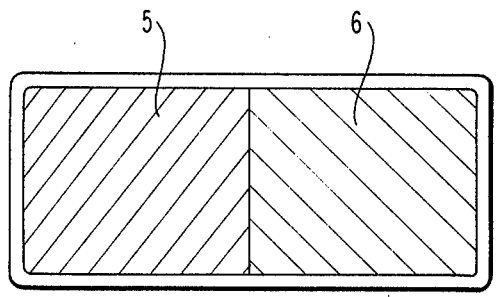

These and other objects, features and advantages of the present invention will become more apparent from the following description when taken in connection with the accompanying drawing which shows, for purposes of illustration only, two embodiments in accordance with the present invention, and wherein:

FIG. 1 is an elevational view of an indication in accordance with the present invention with an indicator movable along two fields of different color, and FIG. 2 is an elevational view of a modified embodiment of an indicating arrangement in accordance with the present invention, in which two indicating lights are provided which light up in different colors and are controllable in their intensity.

Referring now to the drawing and more particularly to FIG. 1, the indicating arrangement for the distance warning installation illustrated in this figure includes two fields of different color, for example, of the colors green and red, whereby the red field 1 is provided on the right side and the green field 2 on the left side of the indicating arrangement. An area 3 is arranged between the two fields 1 and 2, which is intended to signal the coincidence of actual value and desired value. The ratio of desired and actual value or the difference therebetween is indicated by a single pointer 4 movable to and fro along the fields 1 and 2 in the longitudinal direction of the indicating system. In the illustrated embodiment the indication would signal to the driver that he would have to apply the brake because the distance to a vehicle driving in front of him is too small if the brake deceleration to be applied, dependent on the road condition and on the vehicle, is taken into consideration. If the driver applies the brake then the pointer 4 will travel toward the left until it reaches the area 3, which indicates to the driver that the actual value and desired value are in agreement. If the pointer 4 continues to travel even into the left field 2, then this will signal to the driver that the brake action can be reduced or that under certain circumstances even an acceleration of his vehicle, i.e., a free drive, is possible. Of course, it would also be possible to increase by conventional means the color intensity of the fields 1 and 2 with increasing distance from the area 3 so that it will be indicated also optically to the driver, for example, by the increase of the red color, that he would have to brake more strongly, or more weakly, if the red color should decrease. The following example will further explain such an arrangement. It is assumed that the arrow 4 is disposed completely to the right in the red field 1, i.e., in the part of this field which is more intense in its color. This means that the driver must brake very strongly. Thereupon, the arrow 4 will move from the outside toward the inside in the direction toward the area 3. The arrow 4 thereby sweeps over the field 1 in the direction of the decrease of the color intensity of the red color. This means that the braking effect now approaches evermore the desired value. If the arrow 4 now passes over the area 3, then it enters into the green field 2 and more particularly moves in the direction of increasing green color intensity. This means that the braking action is excessive, i.e., that the brake can be increasingly retracted. Under certain circumstances, toward the end of this area, i.e., completely toward the outside of this area, the brake can already be completely released and possibly the gas pedal may again be depressed to give gas for acceleration.

Another indicating possibility which renders superfluous the observation of a pointer is shown in FIG. 2. In this embodiment, two lights 5 and 6 are provided in an indicating field, which also have different colors. The left light 5 can thereby again have the green color and the right light 6 the red color; one will thereby start with the fact that the light 6 indicates a necessary braking deceleration whereas the green light 5 indicates free drive. If now one starts again from the situation, as is indicated in FIG. 1, then in the embodiment according to FIG. 2, the right, red light 6, would light up whereas the left light 5 is extinguished. For the case that the actual value and the desired value coincide, then the light 6 would become extinguished and the green light would light up when the area of coincidence of actual and desired value has been exceeded in the direction toward the other side. This type of indication would, however, lead to the fact, if the vehicle moves constantly within the area of coincidence of actual value and desired value, that a continuous blinking which takes place constantly sequentially, of the one light or of the other light occurs. In order to avoid this, the indication may also be so constructed by conventional means that within the area of agreement or coincidence of the actual value and of the desired value, both lamps light up simultaneously and the one or the other becomes extinguished only when the indicating value deviates toward the one or the other side. It is even possible and very advantageous to control the light intensity of the two lamps 5 and 6 in dependence on the difference or on the ratio of the desired value and actual value by the use of conventional means in such a manner that at ratios, at which a free drive is possible without question, the left green lamp 5 lights up green very strongly and loses slowly its illuminating intensity, when the vehicle approaches from a distance an obstacle disposed in front thereof. With an increasing fading out of the green light, then beginning with a predetermined ratio, namely when the vehicle reaches the area of the coincidence of the actual value and of the desired value, the right red light 6 may already slowly start to glow weakly so that in this manner it will be indicated to the driver in a very simple and convincing manner how he has to handle his vehicle. The light intensity of the right light 6 would increase strongly whereas simultaneously the left light 5 becomes extinguished when a brake deceleration is necessary to an increasing extent. The new indicating arrangement makes possible a much more simple and less complicated observation and serves therefor the purpose of a considerably simpler recognition of danger situations.

Any known distance measuring and evaluating devices, schematically illustrated in FIG. 1, utilizing, for example, radar, infrared or ultrasonics, as known in the art, may be used with the present invention to measure the distance as well as the rate of approach to the preceding vehicle and to obtain the actual value and desired value for a given situation. Furthermore, conventional means may be used to deflect the light indications and/or control the intensity thereof utilizing, for example, conventional computer technology, schematically illustrated in FIG. 1, with conventional logic circuits and conventional optical systems with appropriate deflection means. Since all of these devices are known as such in the art, and thus form no part of the present invention, a detailed description thereof is dispensed with herein. However, in a particularly appropriate realization, the measuring and evaluating devices may be of the type as described in the aforementioned German application in which the difference of velocity and the distance are used to determine the magnitude of the desired value. With an assumed residual distance, the magnitudes for the reaction time as well as the values for the average braking of the preceding vehicle during the braking operation and the average braking of the trailing vehicle during the braking operation are derived from experience values. Utilizing the following equation, which is fully explained in said German application, it is possible for the computer to calculate by conventional means, utilizing known logic elements and circuits, the magnitude of the necessary deceleration which would be sufficient in order to prevent a collision with the given conditions:

$$A = s_R + t_R \cdot V_{02} + V_{02}^2/2a_2g - V_{01}^2/2a_1g$$

With $V_{01} = V_{02} - \Delta V$, there results: $V_{01}^2 = V_{02}^2 - 2V_{02} \cdot \Delta V - \Delta V^2$ and thus:

$$A = s_R + t_R \cdot V_{02} + \frac{V_{02}^2}{2g}\left(\frac{1}{a_2} - \frac{1}{a_1}\right) + V_{02} \cdot \frac{\Delta V}{a_1 \cdot g} - \frac{\Delta V^2}{2a_1 \cdot g}$$

whereby:
$s_R$ is the residual distance (m)
$t_R$ is the reaction time (sec)
$V_{01}$ is the velocity of the leading vehicle at the considered instant (m/sec)
$V_{02}$ is the velocity of the trailing vehicle at the considered instant (m/sec)
$a_1$ is the average braking of the leading vehicle during the braking operation (—)
$a_2$ is the average braking of the trailing vehicle during the braking operation (—)
and
$\Delta V$ is the difference velocity (m/sec)

While we have shown and described two embodiments in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

We claim:

1. An indicating arrangement with an indicating means for a distance warning system in motor vehicles that includes measuring and evaluating means for determining the distance of the vehicle to an obstacle disposed in front thereof and for determining the approach velocity to this obstacle, and means for deriving from the determined values a desired value for the brake deceleration necessary for the avoidance of a collision and an actual value from the actual deceleration values attained during the braking operation, and means for utilizing the desired and actual value for the indication in the indicating arrangement, characterized in that said lastmentioned means includes further means operable to indicate on said indicating arrangement only one of the two values consisting of difference and ratio of desired value and actual value.

2. An indicating arrangement according to claim 1, characterized in that said further means indicates only the difference of desired and actual value.

3. An indicating arrangement according to claim 1, characterized in that said further means indicates only the ratio of desired value to actual value.

4. An indicating arrangement according to claim 1, characterized in that said further means provides an optical indication.

5. An indicating arrangement according to claim 4, characterized in that the optical indication includes lamp means lighting up in different colors, of which one lamp means lights up if no brake deceleration is required and the other lamp means lights up when a braking action is required.

6. An indicating arrangement according to claim 5, characterized by control means for controlling the intensity of the lamp means in dependence on one of ratio or difference of desired value and actual value.

7. An indicating arrangement according to claim 6, characterized in that said control means is operable to light up both lamp means during substantial coincidence of actual value and desired value.

8. An indicating arrangement according to claim 4, characterized in that the indication includes a pointer means movable on a scale having one field for necessary brake deceleration and a field separate therefrom which indicates a substantially danger-free drive.

9. An indicating arrangement according to claim 8, characterized in that an area is provided between the two fields which represents substantial coincidence of actual value and desired value.

* * * * *